Jan. 17, 1950

L. D. NADEL 2,495,019

ROLL FILM CAMERA HAVING DIFFERENTIAL MEANS FOR OPERATING PRESSURE PADS

Filed April 19, 1946

INVENTOR.
Louis D. Nadel.
By Emery, Booth, Townsend, Miller and Weidner.
Attys.

Jan. 17, 1950 L. D. NADEL 2,495,019
ROLL FILM CAMERA HAVING DIFFERENTIAL
MEANS FOR OPERATING PRESSURE PADS
Filed April 19, 1946 4 Sheets-Sheet 2

INVENTOR.
Louis D. Nadel
by Emery, Booth, Townsend, Miller and Sheidner
Attys

Fig. 4

Patented Jan. 17, 1950

2,495,019

UNITED STATES PATENT OFFICE 2,495,019

ROLL FILM CAMERA HAVING DIFFERENTIAL MEANS FOR OPERATING PRESSURE PADS

Louis D. Nadel, Rochester, N. Y., assignor to Graflex, Inc., Rochester, N. Y., a corporation of Delaware Application April 19, 1946, Serial No. 663,547

31 Claims. (Cl. 95—31)

This invention relates to film feed mechanism for use particularly in conjunction with power driven cameras.

In order that the principle of the invention may be readily understood, I have disclosed a single embodiment thereof in the accompanying drawings, wherein—

There have been used many different types of film feed mechanism for the purpose of drawing film across the exposure aperture of the camera, with means to control or meter the amount of film so drawn across the exposure aperture for any given camera cycle. This is usually accomplished through some type of clutching means that must be accurately synchronized with the camera mechanism. It is a general practice in cameras of the type to which my invention is particularly applicable to employ a pressure pad for holding the sensitized material firmly in contact with the exposure aperture frame. These pressure pads heretofore have been controlled by the camera mechanism and, of course, it is necessary accurately to time the action of the pressure pad with the feeding of film, so that the pressure pad may be removed from contact with the film strip during that part of the cycle in which the film is moving, and it is essential that the pressure pad be in contact with the film during exposure.

In my invention the position of the pressure pad is controlled by the mechanism for winding the film incident to exposure, and it is impossible for the pressure pad to become out of time with the film feed, which might occur in other constructions in the event of improper assembly or the shifting of some component of the cycling mechanism, thus throwing the pressure pad operation out of time with the film drive. This cannot happen with my invention as the pressure pad operation is, as stated, controlled by the winding of the film incident to exposure, as will be set forth in detail herein.

One of the objects of my invention is to provide a film feed drive mechanism that is always positive in its action. Other objects of the invention are to provide a film feed drive that also controls the action of the pressure pad, to provide a film feed mechanism wherein the pressure pad is positively lifted from contact with the film strip before the film starts to move, and to provide a film feed drive and pressure mechanism wherein the pressure pad is returned into contact with the film strip at the completion of the film feed cycle.

While not restricted thereto, my invention relates more particularly to power driven cameras, such as aerial cameras, as most clearly disclosed in the application of Archie H. Gorey, filed October 23, 1945, Serial No. 623,913, and in the ensuing description I will refer only to those parts disclosed therein that are necessary for a clear understanding of my invention herein claimed and shown but not claimed in said Gorey application.

Figure 1:
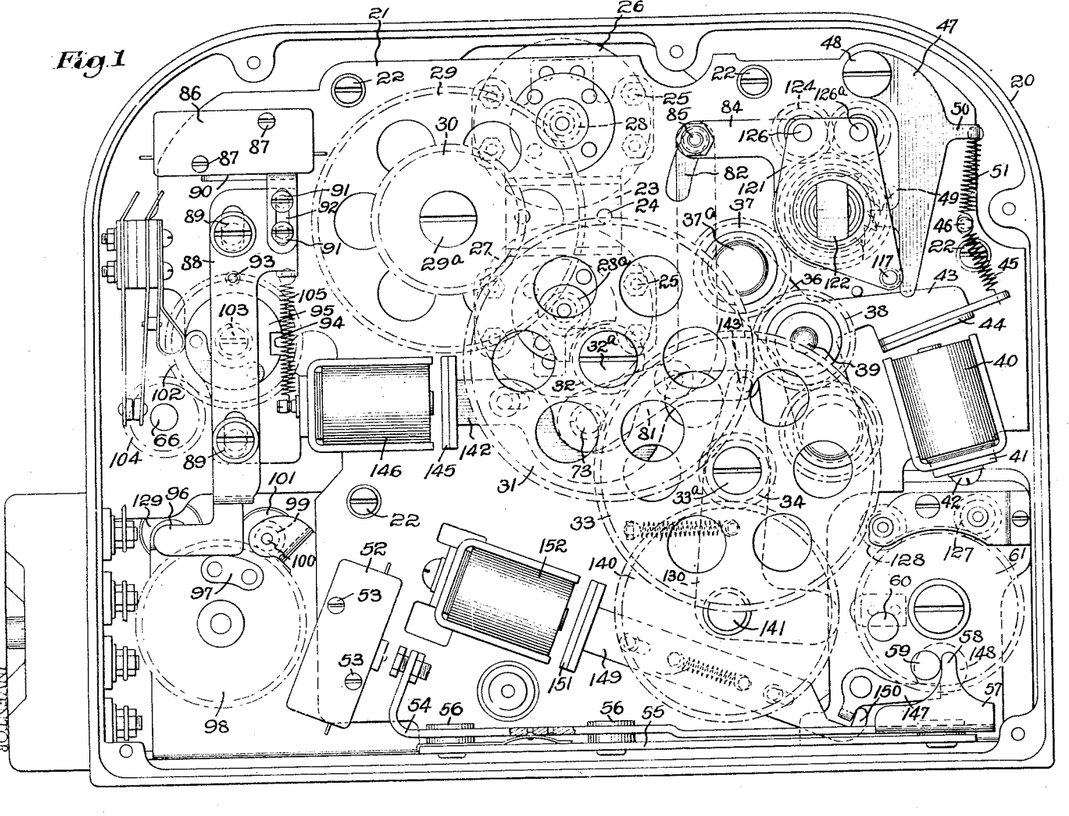
Fig. 1 is a side elevation of a power driven photographic camera having the cover plate removed and showing the location of the several parts of my invention.

Referring more particularly to the drawings:

In Fig. 1 a mechanism housing of a camera is shown at 20, the cover plate thereof having been removed. Attached to the housing 20 is a mechanism plate 21, it being secured in position by means of screws 22, 22. Also attached to the mechanism plate 21 is a motor mounting plate or bracket, indicated in dotted lines at 23, and secured to the mechanism plate 21 by means of rivets 24, 24. Separately attached to the motor mounting plate or bracket 23, by means of bolts indicated at 25, 25, are motors 26, 27 shown also in Fig. 2.

Figure 2:
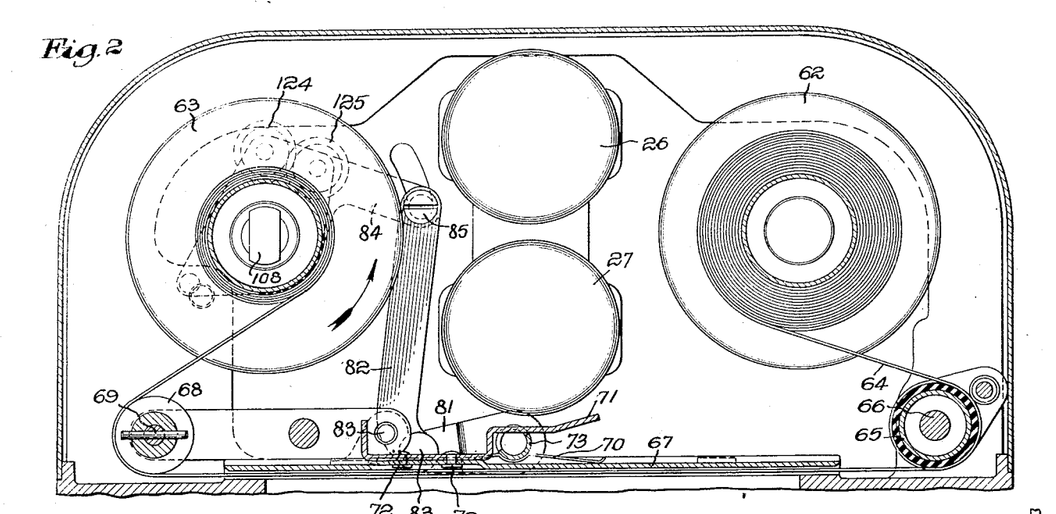
Fig. 2 is a transverse section through a photographic camera showing the drive motors, film spools, film idler roll, film measuring roll, film pressure pad, and pressure pad actuating means.

The motor 26 is provided with a pinion 28, and the motor 27 is provided with a pinion 28a. The said pinions 28, 28a mesh with a large drive gear 29 having a pinion 30 meshing with an idler gear 31 which is provided with a pinion 32 meshing with a film rewind gear 33 which is itself provided with a pinion 34 meshing with a gear 35 carried on a rocker arm 36, better shown in Fig. 4, to which figure attention is particularly directed. As there shown, carried on the said rocker arm 36 is a gear 37 meshing with an idler pinion 38, both the idler pinion 38 and the rocker arm 36 being pivoted on a stud 39. Mounted upon the mechanism plate 21 is an electromagnet 40 attached to an upturned ear 41, being secured thereto by a screw 42. The said rocker arm 36 is provided with a right-hand extending member or part 43 to which is attached an armature member 44. Also secured to the said member 43 is a spring 45, the opposite end whereof is attached to a pin 46 upon the mechanism plate 21.

Figure 4:
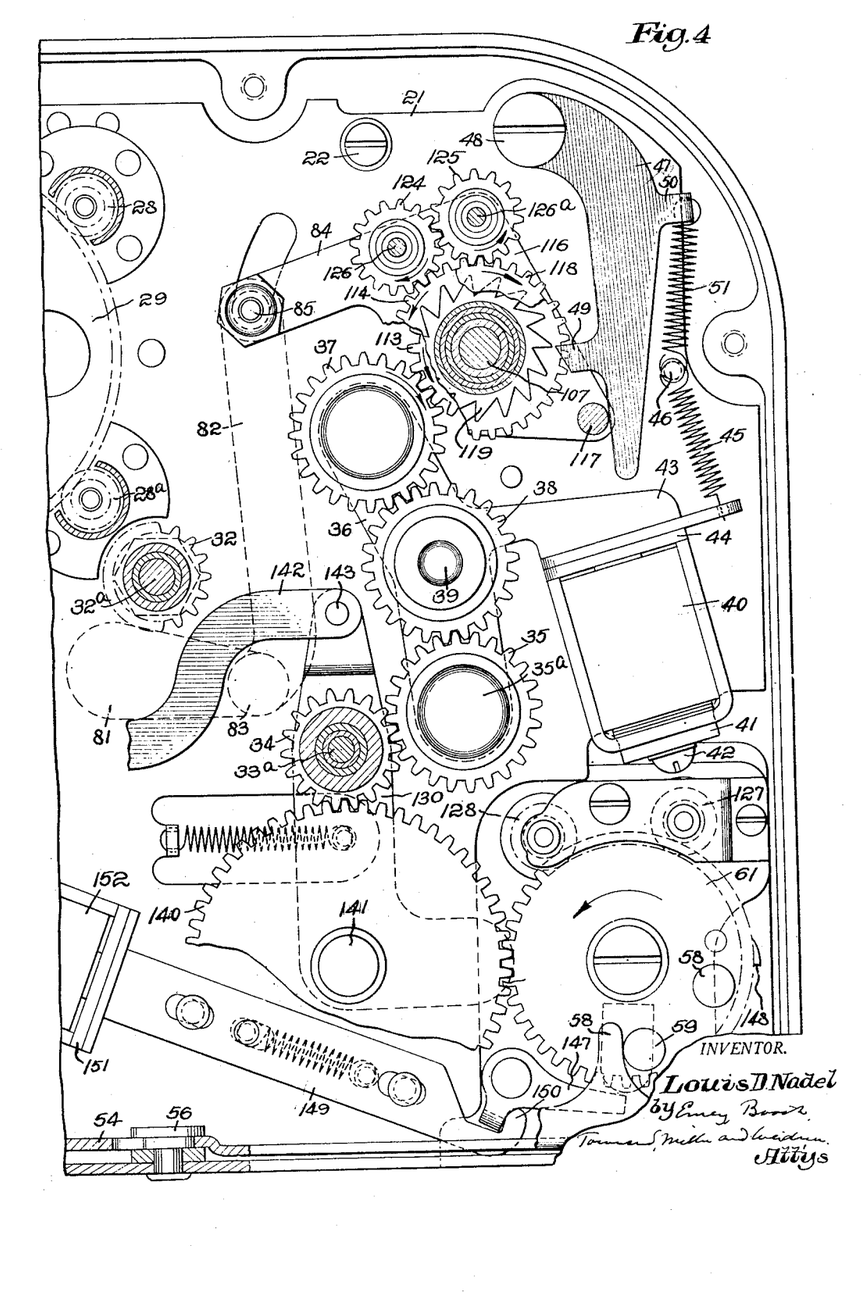
Fig. 4 is an enlarged fragmentary detail of Fig. 1, some of the parts having been removed most clearly to show the construction of the film rewind mechanism, the parts whereof are in the position occupied during film feed.

Also secured to the said mechanism plate 21 is a latch member 47 pivoted on a shoulder screw 48. The said latch member 47 is provided with a subsequently-described dog 49 and with a right-hand extending finger 50, to which latter is attached a spring 51, the opposite end whereof is secured to the pin 46, previously referred to.

Referring again to Fig. 1, also fastened to the mechanism plate 21 is a switch 52, it being secured by means of screws 53, 53. The said switch 52 is actuated by a sliding bar 54 mounted on an upturned lip 55 of the said mechanism plate 21, and attached thereto by shoulder rivets 56, 56. To the right-hand end of the said sliding bar 54 is secured a turned-up member 57 having a finger 58 that is contacted or engaged by a pin 59 when the camera shutter is fully rewound, and by a pin 60 when the shutter is in its run-down condition. The said pins 59 and 60 are carried by a shutter curtain gear 61, more fully referred to subsequently.

Figure 3:
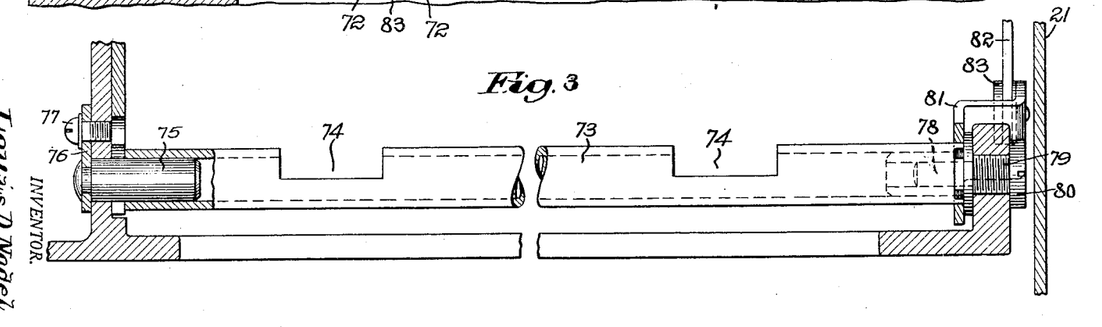
Fig. 3 is a detail partly in section, taken at the pressure pad lifting bar.

In Fig. 2 there is shown in cross section the camera magazine wherein a film supply spool 62 is suitably mounted and also a take-up spool 63, both being of the conventional type used in aerial cameras. Wound on the said film supply spool 62 is shown a film 64 that passes over a measuring roller 65 having a shaft 66, under a pressure pad 67, around an idler 68 provided with a shaft 69, and thence onto the film take-up spool 63. The said pressure pad 67 is provided with a pair of pressure springs 70, one only being shown, and with a pair of pressure pad positioning members 71, only one being shown in section, Fig. 2. The said positioning member 71 is secured to the pressure pad 67 by rivets 72, 72. Positioned in the film magazine, as clearly shown in Fig. 3, is a pressure pad actuating shaft or member 73 having notches 74, 74. One end of the pressure pad operating member 73 is carried on a pin 75 and is secured to one wall of the magazine by a retaining member 76 and a screw 77. The opposite end of the pressure pad operating member 73 is carried on a pin 78 having a threaded portion 79 and a head 80. The said threaded portion 79 is threaded into the opposite side of the magazine body, thus providing a second bearing for the pressure pad operating member 73, and secured to the said pressure pad operating member 73 is a crank member 81 attached to a pressure pad operating link 82 by means of a shoulder rivet 83. The other end of the link 82 is connected to a differential arm 84 by a shoulder screw 85. The said differential arm 84 and its function will be more clearly described subsequently.

Again referring to Fig. 1, secured to the mechanism plate 21 is a switch 86 held to the said mechanism plate 21 by screws 87, 87. Also secured to the said mechanism plate 21 is a switch-operating member 88 held thereto by shoulder screws 89, 89. To the upper end of the said switch operating member 88 is fastened an L-shaped adjustable member 90 by means of screws 91, 91. The said L-shaped member 90 is provided with an adjusting, lengthwise-extending slot 92 to provide means for adjusting the L-shaped member 90 with respect to the switch-operating member 88. The latter member is also provided with a pin 93 that engages a notch 94 of an index disk 95, to be referred to more at length subsequently. The lower end of the said switch-operating member 88 is provided with an extending finger 96 engaged by a cam block 97 of a gear 98. The said gear 98 meshes with a capping curtain pinion 99, shown in dotted lines in Fig. 1. The said capping curtain pinion 99 is fitted to a shaft 100 which is in turn securely attached to a capping curtain roller 101. The said index disk 95 is mounted on a gear 102 and rotates therewith. The said gear 102 and the said index disk 95 are carried on a shoulder screw 103, shown in dotted lines in Fig. 1, which is fitted into the mechanism plate 21. Meshing with the said gear 102 is a pinion 104 carried on the measuring roller shaft 66, previously referred to.

When the gear 98 is in the position shown in Fig. 1, the switch operating arm 88 is held in an upward direction by the cam 97, thus preventing the pin 93 from riding on the periphery of the index disk 95. However, when the gear 98 is turned through the operation of the camera shutter, the cam block 97 will be removed from the finger 96, allowing the pin 93 to ride on the periphery of the index disk 95, and as film is being wound, the gear 104 is turned through the measuring roll 65, thus turning the gear 102, and since the switch operating arm 88 is biased by a suitably supported spring 105 in a downward direction, the pin 93 will drop into the notch 94 of the index disk 95 when the said notch 94 reaches a position to receive the pin 93, thus operating the switch 86. This mechanism will be again referred to when the full operation of the invention is explained.

Figures 5, 6:
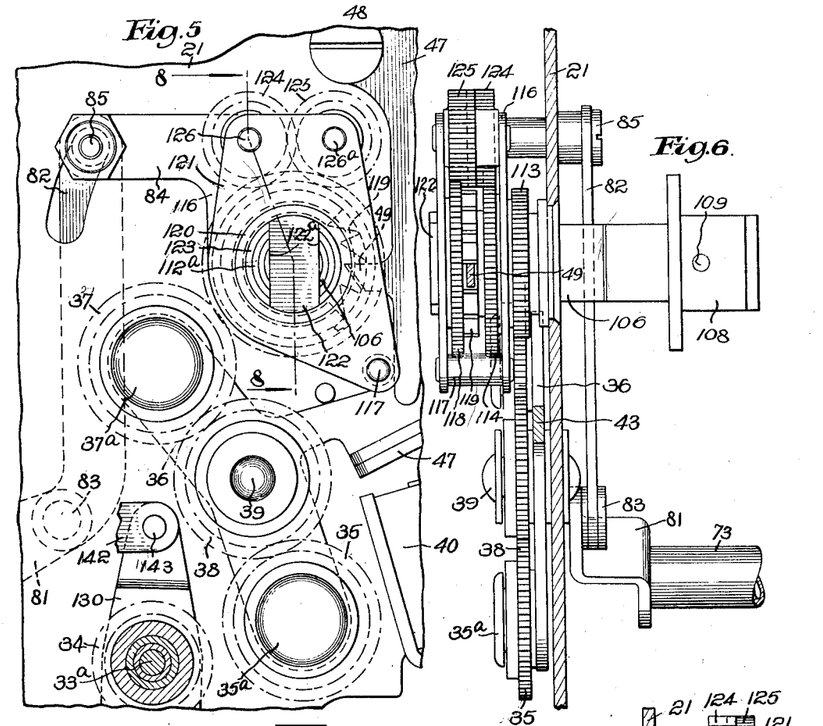
Fig. 5 is a fragmentary detail similar to Fig. 4, but showing the mechanism in the position when no film is being fed.
Fig. 6 is an end view of Fig. 5, partially in section most clearly to show the mechanism.
Figure 7:
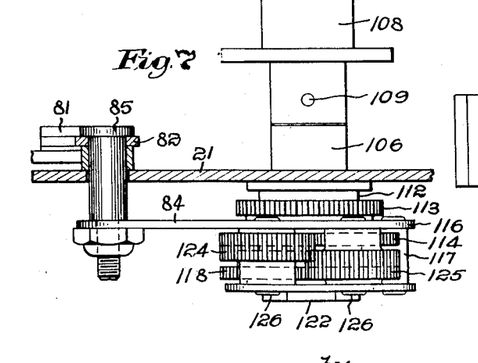
Fig. 7 is a top plan view of Fig. 5.
Figure 8:
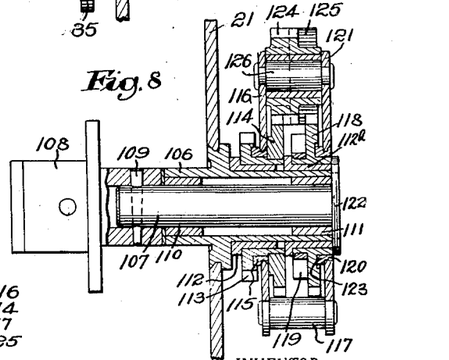
Fig. 8 is a vertical section through Fig. 5, on the line 8—8 thereof.

Referring to Figs. 4 to 8 and particularly to Figs. 6 and 8, to the mechanism plate 21 is attached a bushing 106, shown in section in Fig. 8. Mounted in said bushing 106 is a shaft 107 having a film spool driving log 108 held to the shaft 107 by a pin 109. Into the bushing 106 are fitted bearing bushings 110 and 111, and the shaft 107 is free to rotate in the said bearing bushings. Fitted to the outside of the bushing 106 is a second bushing 112. Free to rotate on the bushing 112 is a gear 113, and fitted to the said gear 113 is a second gear 114. Between the gears 113 and 114 is a bushing 115 that is free to rotate on the hub of the gear 113. The bushing 115 is fitted into a hole provided therefor in a differential inner plate 116. The gears 113 and 114 are free to rotate on the bushing 112 and on the bushing 115.

Fitted to the outer end of the bushing 106 is a bearing bushing 112a, and free to rotate thereon is mounted a gear 118. Upon the hub of the said gear 118 is mounted a ratchet wheel 119, and upon the hub of the said gear 118 is also fitted a bearing 120 which is itself fitted in a suitable hole in a differential outer plate 121. The said gear 118 and the ratchet wheel 119 are free to rotate on the bushing 112a and in the bushing 120.

The right-hand end of the shaft 107 is provided with a large diameter head 122 having milled thereon flats 122a, 122a, and the hub 123 of the said gear 118 is provided with a suitable milled slot into which is fitted the head 122 of the shaft 107. Therefore, the gear 118 and the shaft 107 are rotated together so that the shaft 107 is caused to turn when the gear 118 is turned.

Fitted between the said differential plates 116, 121 are pinions 124, 125 which rotate on suitable shafts provided therefor, the shaft for the pinion 124 being indicated at 126. The shaft for the pinion 125 is of a similar structure and is indicated at 126a, being best shown in Fig. 4. The said shafts 126 and 126a are provided with reduced diameter ends that are fitted into suitable holes in the said differential plates 116 and 121 and are riveted thereto. A spacer, located between the said differential plates 116 and 121, is indicated at 117. The pinion 125 meshes with the said gear 118 and the pinion 124 meshes with the gear 114, and the said pinions 124 and 125 also mesh with each other.

The mechanism just described constitutes a so-called differential drive mechanism. Referring to Figs. 4, 6 and 8, when power or turning movement is applied to the gear 113, the pressure pad operating arm 84 will be moved in a clockwise direction, viewing Figs. 1 and 4, if the shaft 107 be prevented from rotating by the ratchet 119 and the dog or pawl 49, or if a load be applied to the shaft 107, as for instance the turning of the film take-up spool 63, Fig. 2, through the driving dog 108 and the winding of film thereon. When driving force is removed from the said gear 113, the film take-up spool 63 will, of course, stop, and the pressure pad operating arm 84 will be free to be turned in a contraclockwise direction by the springs 70, 70.

The mechanism just described is fully disclosed in the said application of Archie H. Gorey, Ser. No. 623,913, but is not claimed therein except in combination with other features. Certain parts of that disclosure, not pertaining directly to the invention herein claimed, are shown herein but are not herein claimed. The showing of the above described features made in this application is necessary in order completely to describe the function and operation of my invention herein claimed.

The aerial camera is normally equipped with a shutter curtain rewind roll 127, Figs. 1 and 4, with a capping-curtain rewind roll 128, Figs. 1 and 4, with a capping-curtain tension roll 131 and a shutter curtain tension roll 129. The operation of the curtain rolls 127, 128 is fully disclosed in the said Gorey application Ser. No. 623,913 and need not be herein further described other than as follows, reference being made particularly to Figs. 1, 4 and 5.

Mounted on a stud on the mechanism plate 21 is a bell crank lever 130, Figs. 1 and 5, the lower end whereof carries a gear 140, held to the said crank lever 130 by a shoulder rivet 141. The upper end of the bell crank lever 130 has connected thereto an operating link 142, Fig. 4, by means of a shoulder rivet 143. The opposite end of the link 142 is provided with an armature 145, Fig. 1, which is acted upon by a solenoid 146. There is provided a shutter release latch 147 that normally engages a dog 148 upon the gear 61 and prevents it from rotating. The said shutter release latch 147 is caused to be turned in a clockwise direction by a slidable bar 149 having a hook-like end portion 150, and the opposite end whereof is provided with an armature 151 acted upon by a solenoid 152 mounted upon the said mechanism plate 21.

The operation of the camera, with particular reference to that portion thereof constituting my invention, is as follows:

Let it be assumed that the camera has been cycled and is in condition for making an exposure. The switch 86, Fig. 1, is in a closed condition because the switch-operating bar 88 is at such time being held in its upper position by the cam block 97. The switch 52, Fig. 1, is at this time in an open condition because the switch operating bar 54 was moved to the right, viewing Fig. 1, when the camera shutter was completely wound after the previous exposure period. A circuit is at this time completed to the solenoid 152, Fig. 1, which circuit closing causes the armature 151 to be moved to the left, moving with it the slidable bar 149 and the hook 150, thus rotating the shutter release latch 147 in a clockwise direction, and withdrawing the said shutter release latch 147 from the dog 148 of the gear 61. This will allow the shutter to run down, and in so doing the pin 60 on the curtain shutter gear 61 will engage the finger 58 of the sliding bar 54, moving it to the left viewing Figs. 1 and 4, thus closing the circuit through the switch 52. This will complete a circuit through the motors 26, 27 and the solenoid 146, and also through the solenoid 40, because, as previously stated, the switch 86, which is in series with the solenoid 40, is now in a closed condition.

The solenoid 146, Fig. 1, will cause the armature 145 to be moved to the left and with it the link 142, thus swinging the bell crank lever 130 in a contraclockwise direction, thereby bringing the gear 140 and gear 61 into mesh as shown in Fig. 4. The rewinding of the shutter will now commence. At the time the circuit was closed at the switch 52, the solenoid 40 was also energized, and it caused the armature member 44 to move in a downward direction, thus swinging the arm 36, Fig. 4, in a clockwise direction, and causing the gear 35 and the pinion 34 to become meshed with each other and also causing the gears 37 and 113 to become meshed with each other.

At this time the differential mechanism will be in the position of the parts shown in Fig. 1, wherein the dog 49 of the lever 47 will engage one of the teeth of the ratchet wheel 119. As the gear 113 is turned in a contraclockwise direction by the motors 26, 27, the gear 114 will also be turned in a contraclockwise direction inasmuch as it is integral with the gear 113. The pinion 124 will be caused to rotate in a clockwise direction, and since the pinion 125 is in mesh with it, the pinion 125 will be caused to rotate in a contraclockwise direction. The said pinion 125 meshes with the gear 118 which would tend to turn in a clockwise direction, but inasmuch as the gear 118 and the ratchet wheel 119 are held fast with each other, the gear 118 cannot now rotate because of the fact that the ratchet wheel 119 is engaged by the dog 49, thus preventing said ratchet wheel 119 from rotating. Therefore, the pinion 125 will be caused to travel around the periphery of the gear 118, and since the pinion 125 rides on the shaft 126a that is securely anchored to the differential plates 116, 121, such differential plates will be caused to rotate in a contraclockwise direction, carrying with them the arm 84, which is integral with the differential plate 116.

As the arm 84 rotates in a contraclockwise direction, the link 82 will be moved in a downward direction, viewing Fig. 4, and the crank member 81 will be turned in a clockwise direction, as will also the pressure plate operating member 73, thus lifting the pressure pad 67 from the film 64, as shown in Fig. 2.

By the time the said pressure pad 67 has been lifted from the film 64, the said differential plates 116, 121 will have rotated in a contraclockwise direction to the position shown in Fig. 4, in which position the separating pin 117 will engage the lower end of the lever 47, withdrawing the dog 49 thereof from the teeth of the ratchet wheel 119. The gear 118 will now be allowed to rotate in a clockwise direction, viewing Fig. 4, turning with it the shaft 107 and also the driving dog 108 and the film take-up spool 63.

The film 64 will now be wound on the said film take-up spool 63, and around the idler roller 68, under the pressure pad 67, around the measuring roller 65 from the film supply spool 62. This will cause the shaft 66 to rotate, turning with it the gear 104, Fig. 1, and also rotating the gear 102, which meshes with it, until the notch 94 of the index disk 95 reaches a position directly under the pin 93 of the switch operating bar 88.

At this time the pin 93 will be riding on the periphery of the index disk 95, because as the shutter starts to rewind, the capping curtain turns the capping curtain roll 101 in a clockwise direction, turns the pinion 93 also in a clockwise direction, and turns the gear 98 in a contraclockwise direction, thus removing the cam block 97 from its position directly under the finger 96 of the switch operating arm 88. When the pin 93 drops into the notch 94 of the index disk 95, the switch 86 will be operated and the circuit to the solenoid 40 will be interrupted. The spring 45, Fig. 1, will thereupon turn the member 36 in a contraclockwise direction, thereby disengaging the gears 37 and 113, and also disengaging the gear 35 and the pinion 34.

There will now be no power applied to the differential mechanism and the spring fingers 70 of the pressure pad 67 will cause the pressure-pad operating member 73 to be rotated in a clockwise direction, viewing Fig. 2, but in a contraclockwise direction viewing Fig. 4, thus turning the crank member 81 in a contraclockwise direction, thereby moving the connecting link 82 in an upwardly direction and the differential arm 84 in a clockwise direction, carrying with it the differential plate 116 and the spacer pin 117 also in a clockwise direction, and thus allowing the dog 49 again to engage a tooth of the ratchet wheel 119, thus stopping any further movement of the film 64, and the pressure pad 67 will be forced into contact with the film 64 by the spring 70.

It will be noted that the construction and operation of the parts compel the pressure pad 67 to be raised from contact with the film 64 before a turning motion of the film take-up spool 63 takes place, and that when the film take-up spool 63 has been stopped, due to the disengagement of the gears 37 and 113, the pressure pad 67 will again be immediately forced into contact with the film 64. This provides a positive action and an exact correlation between the operation of the film drive mechanism and of the pressure pad 67.

The mechanism of the camera is such that the film winding will always be completed before the camera shutter is fully rewound. Therefore, the motors 26, 27 will continue to revolve until the shutter has been fully rewound and until the switch 52 has been opened. Just as the shutter is fully rewound, the capping curtain is released and allowed to return to an open condition, as indicated in Fig. 1, wherein the cam block 97 of the gear 98 will again contact with the finger 96 of the switch operating member 88, thereby lifting the pin 93 out of the opening 94 of the index disk 95 and closing the switch 86. However, no current will now flow to the solenoid 40 to cause further rewinding of the film 64, inasmuch as at the instant when the capping curtain started to run down, the switch 52 was at that time opened by the pin 59 of the shutter gear 61, said pin 59 having engaged the finger 58 and having thereby moved the switch bar 54 to the right, thereby opening the circuit at the switch 52, stopping the motors 26, 27, and breaking the circuit to the solenoid 146 controlling the shutter rewind gears.

I have herein disclosed means providing a simplified and accurate control of a camera pressure pad with relation to the film driving mechanism of the camera. While I have shown said means applied to a specific camera or camera of a certain type, it will be apparent that any driving means that will intermittently drive the gear 113 a sufficient distance to rewind enough film for a second exposure, will operate entirely satisfactorily. The said means of my invention will also operate with a different type of measuring device; that is, any measuring device that will impose an interruption of turning movement upon the gear 113 may be used for operating the film feed and the pressure pad control mechanism.

It will be noted that normally the pressure pad 67 is in contact with the film 64 at all times excepting when the film is being moved, and that the pressure pad 67 is lifted from the film 64 only long enough to permit feeding of the film, or during the time when the film is actually being moved. The disclosed means constituting my invention has proved highly satisfactory in driving large film spools of the aerial camera type at high rates of speed, and in accurately correlating the pressure pad 67 with the film movement, and it is impossible for the pressure pad elements to get out of timing or synchronism with the film feed, as frequently happens in other structures and which lack of coordination has been the cause of a great many camera failures.

As we hereinbefore pointed out, the feeding movement of the film causes the pressure pad to be lifted (i. e. separated from the film). So far as I am aware this is broadly new with me, and I claim the same broadly. While in former constructions there has been a cam or equivalent which was intended to lift the pressure pad from the film at the proper time, the parts might not be properly assembled or may get out of correct relative position. Also the length of the film may and does vary on different rolls, or the gearing might be set a little in error. Any of these things would or might result in lifting the pressure pad at the wrong time.

So far as I am aware, I am the first to employ a differential movement or mechanism between the film feeding means and the pressure pad. Its use in the described connection insures accuracy of operation and a synchronization of the movement of the parts.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera having an exposure opening and having means to receive and support a film supply spool and a film take-up spool in functioning relation to said exposure opening, film feeding means including means to rotate said take-up spool to feed intermittently the supported film lengthwise from the supply spool to the said take-up spool, a pressure pad mounted for movement to and from the face of the film when extending across the exposure opening, thereby to hold said film flatwise in position at said exposure opening when stationary and to remove pressure from the film for the periods the latter is being fed, means coacting in operation with the said film feeding means and with the said pressure pad and operatively connected with both said film take-up spool of the said film feeding means and with said pressure pad and interposed between said film take-up spool and said pressure pad, and constituting mechanism whereby the pressure pad is positively lifted from contact with the film before the film starts to move, said co-acting means including differential mechanism operatively connected with said film feeding means and with said pressure pad, whereby the differential movement of said differential mechanism acts to withdraw the pressure pad from its contact with the face of the film.

2. A photographic camera in accordance with claim 1, but wherein said differential mechanism and said co-acting means include a shaft provided with a gear, means to hold said shaft and its said gear stationary at times, operating connections between said shaft and its gear and the film feeding means, and gearing meshing with said gear and operatively connected with said pressure pad, whereby when said shaft and its said gear are held stationary, the said gearing meshing with the said gear and connected with the pressure pad, is caused to travel bodily about the said gear, and thereby to impart lifting movement to the said pressure pad.

3. A photographic camera for making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose the following: means including a film supporting spool and a film take-up spool to support a sensitized film, the said film feeding means including means to impart rotative movement to said film take-up spool, a pressure pad to engage flatwise a surface of the sensitized film whenever the said film is not being fed, and differential mechanism co-acting in operation with the said film feeding means and with the said pressure pad and operatively connected with both said film take-up spool of said film feeding means and with said pressure pad and interposed between said film take-up spool and said pressure pad, and providing a film feed mechanism wherein the pressure pad is positively lifted from contact with the film before the film starts to move, but wherein the act of feeding the film and the separating of the pressure pad from the sensitized film occur very nearly simultaneously.

4. Means for operating the pressure pad of a photographic camera comprising, in combination means to support a film including a film supply spool and a film take-up spool, film feeding means including means to rotate said film take-up spool, a pressure pad to engage flatwise the surface of the film whenever the film is not being fed, means co-acting in operation with the said film feeding means and with the said pressure pad and operatively connected with both said film take-up spool of the said film feeding means and with said pressure pad and interposed between said film take-up spool and said pressure pad, and constituting film feed mechanism wherein the pressure pad is positively lifted from contact with the film before the film starts to move, and whereby the act of feeding the film and the separation of the pressure pad from the sensitized film occur very nearly simultaneously, said co-acting means including differential mechanism which has means holding one part thereof stationary and causing another part thereof engaging the said part held stationary to travel about such part held stationary, and by such traveling movement to remove the pressure pad from contact with the film very shortly before said take-up spool is rotated in the film feeding movement.

5. Means for operating the pressure pad of a photographic camera comprising, in combination, means to support a film including a film supply spool and a film take-up spool, film feeding means including means to rotate said film take-up spool, a pressure pad to engage flatwise the surface of the film whenever the film is not being fed, means co-acting in operation with the said film feeding means and with the said pressure pad and operatively connected with both said film take-up spool of the said film feeding means and with said pressure pad and interposed between said film take-up spool and said pressure pad, and constituting film feed mechanism wherein the pressure pad is positively lifted from contact with the film before the film starts to move, and whereby the act of feeding the film and the separation of the pressure pad from the sensitized film occur very nearly simultaneously, said co-acting means including differential mechanism which has a gear, means acting predeterminedly to hold said gear temporarily from rotation, another gear in mesh with said gear predeterminedly held temporarily from rotation and which, when such gear is so held from rotation, is caused to travel along the periphery of the gear so held stationary, a part whereon said second mentioned gear is mounted and which, by the traveling action of said second mentioned gear, is itself caused to move, and by such movement of the part whereon said second mentioned gear is mounted, acts to remove the pressure pad from contact with the film very shortly before said take-up spool is rotated in the film feeding movement.

6. In a photographic camera for the taking of still pictures, means for operating the pressure pad of such camera comprising, in combination, means to support a film including a film supporting spool and a film take-up spool, film feeding means including means to rotate said film take-up spool to feed the film by a direct pulling action thereon by rotating movement of said film take-up spool, a pressure pad to engage flatwise the surface of the film whenever the film is not being fed, and means between and operatively connected both to the film feeding means and to the pressure pad, and thereby transmitting its movement to said pressure pad, to remove the pressure pad from contact with the film very shortly before rotative movement occurs of said film take-up spool of the said feeding means, such operatively connected means including differential mechanism which has means holding one part thereof stationary and causing another part thereof engaging with the said part held stationary to travel about such part held stationary, and by such traveling movement to remove the pressure pad from contact with the film through such differential mechanism and very shortly before the said rotative movement of said film take-up spool begins.

7. A photographic camera for the taking of still pictures by making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose means including a film supply spool and a film take-up spool to support a sensitized film to be intermittently fed, film feeding means including means to rotate said film take-up spool to feed intermittently the sensitized film solely by imparting lengthwise pulling tension thereto, thereby to wind the film from the said film supply spool to said film take-up spool past the film exposure area of the camera, a pressure-pad-like member supported to engage flatwise the surface of the film when stationary, between the feeding movements thereof, and thereby to hold the film when not being fed, and differential mechanism co-acting in operation with the said film feeding means and with the said pressure pad member and operatively connected with both said film take-up spool of the film feeding means and said pressure pad member and interposed between said film take-up spool and said pressure pad member, and constituting a film feed mechanism wherein the pressure pad is positively lifted from contact with the film very shortly before the film starts to move, and whereby the act of feeding the film and the separation of the pressure pad from the sensitive film occur very nearly simultaneously, thereby through said operatively connected co-acting differential mechanism compelling the immediate separation of the pressure-pad-like member from its flatwise engagement with the surface of the film.

8. Means to withdraw the pressure pad of a still-picture photographic camera from the face of the film strip mounted in the camera very nearly simultaneously with the commencement of the act of feeding the film, comprising, in combination, a still-picture photographic camera having means including a film supply spool and a film take-up spool to support a film therein, means including means to rotate said film take-up spool to impart a lengthwise, forward pulling, feeding movement to said film to feed the same to present an unexposed area of the film for exposure, a pressure pad supported in the camera for movement away from and reverse movement against the face of the film, and differential mechanism connected to said film take-up spool and to said pressure pad and interposed between said means for imparting feeding movement to the film and said pressure pad, and operatively connected to and co-acting with the said pressure pad, thereby to compel the immediate separation of the pressure pad from the face of the film very nearly simultaneously with the beginning of the film feeding movement, but very slightly before the beginning of said film feeding movement.

9. A photographic camera for making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose a film supporting spool and a film takeup spool to support a sensitized film, film feeding means including means to rotate said film take-up spool, thereby to feed the sensitized film by imparting lengthwise tension thereto, thereby to wind the same from said film supporting spool onto said film take-up spool, a pressure pad-like member supported to engage flatwise the surface of the sensitized film, and thereby hold the same when not being fed, and means co-acting in operation with the said film feeding means and with the said pressure pad-like member and operatively connected with both said film take-up spool of the said film feeding means and with said pressure pad-like member, and interposed between said film take-up spool and said pressure pad-like member, and including differential mechanism connected to said pressure pad-like member, thereby to move said padlike member to separate the same from the film in each camera cycle, by movement of said differential mechanism, and also including means constituting a part of the mechanism to carry through the succession of camera cycles to initiate the action of said differential mechanism in each such cycle, thereby providing a film feed mechanism for the camera wherein the pressure pad-like member is positively separated from contact with the sensitized film strip before the sensitized film starts to move, and whereby the act of feeding the sensitized film and the separation of the pressure pad-like member therefrom occur very nearly simultaneously.

10. A photographic camera for making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose film supporting means including a film supply spool and a film take-up spool, film feeding means including means to rotate said film take-up spool, a pressure pad to engage the film when stationary and to be withdrawn from the face of the film during film feeding movement, and means co-acting in operation with the film feeding means and with the pressure pad and operatively connected with both said film take-up spool of the said film feeding means and with said pressure pad and interposed between said film take-up spool and said pressure pad, and including differential mechanism connected to said pressure pad, thereby to move said pressure pad to separate the same from the film in each camera cycle by movement of said differential mechanism, and also including means constituting a part of the mechanism for carrying through the camera cycle, to initiate the action of said differential mechanism in such cycle, thereby providing a film feed mechanism for the camera wherein the pressure pad member is positively separated from contact with the said sensitized film strip before the sensitized film starts to move, said co-acting means including a shaft, and means to turn said shaft to withdraw the pressure pad from and to restore it to contact with the film, said means to turn said shaft including as a part of said differential mechanism a crank connected to said shaft and a link connected to said crank and a mechanism plate secured to the camera structure and having a slot therein receiving an end of said link.

11. A photographic camera for making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose film supporting means including a film supply spool and a film take-up spool, film feeding means including means to rotate said film take-up spool, a pressure pad to engage the film when stationary and to be withdrawn from the face of the film during film feeding movement, and means co-acting in operation with the film feeding means and with the pressure pad and operatively connected with both said film take-up spool of the said film feeding means and with said pressure pad and interposed between said film take-up spool and said pressure pad, and including differential mechanism connected to said pressure pad, thereby to move said pressure pad to separate the same from the film in each camera cycle by movement of said differential mechanism, and also including means constituting a part of the mechanism for carrying through the camera cycle, to initiate the action of said differential mechanism in such cycle, thereby providing a film feed mechanism for the camera wherein the pressure pad member is positively separated from contact with the said sensitized film strip before the sensitized film starts to move, said co-acting means including a shaft, and means to turn said shaft to withdraw the pressure pad from and to restore it to contact with the film, said means to turn said shaft including a crank connected to said shaft and a link connected to said crank, and means including means coordinating in action with the film feeding means acting through said crank and link to turn said shaft, and thereby lift the pressure pad from the film.

12. A photographic camera for making successive exposures upon a sensitized film carried thereby comprising a camera housing having an exposure opening and having a focal plane curtain shutter mounted in said housing, and mechanism to carry through a succession of camera cycles for the making of a succession of pictures upon said unexposed film, each cycle including feeding intermittently the supported sensitized film for exposing successive areas of the film, rewinding the shutter, causing a pressure pad to contact with the sensitized surface of the film while the latter is stationary, and causing separation of the pressure pad from the sensitized film very shortly before the winding movement of the film begins after each exposure, and returning the pressure pad to contact with the film upon completion of the feeding movement thereof preceding the exposure of an area thereof, said mechanism including for that purpose film supporting means for the sensitized film including a film supply spool and a film take-up spool, and electrically operated means for intermittently feeding the sensitized film for the next exposure by rotating said film take-up spool, including an electric circuit, a motor therein, a train of gearing driven by said motor including a film rewind gear, a pivoted gear-carrying rocker member having an arm provided with an armature, a film clutch magnet in said circuit to rock said member by acting electrically upon said armature, said electric circuit having means to energize said magnet when sensitized film is to be fed one step by said electrically operated means, thereby to rock said rocker member to bring a gear carried by said rocker member into meshing relation with said film rewind gear, whereby said film is fed a single step following the exposure of a sensitized area thereof.

13. A construction in accordance with claim 12, wherein there is provided a pinion upon said rocker member, and there is also provided a co-acting gear, said pinion and said co-acting gear constituting a part of the film feeding means, the said co-acting gear being turned in one direction when the said electric motor in the circuit is rotated to rewind the shutter, and gearing connections between said co-acting gear and said shutter.

14. A photographic camera comprising film supporting means for the sensitized film including a film supply spool and a film take-up spool, and electrically operated means for intermittently feeding the sensitized film for the next exposure by rotating said film take-up spool, including an electric circuit, a motor therein, a train of gearing driven by said motor including a film rewind gear, a pivoted gear-carrying rocker member having an arm provided with an armature, a film clutch magnet in said circuit to rock said member by acting electrically upon said armature, said electric circuit having means to engage said magnet when sensitized film is to be fed one step by said electrically operated means, thereby to rock said rocker member to bring a gear carried by said rocker member into meshing relation with said film rewind gear, whereby said film is fed a single step following the exposure of a sensitized area thereof, a gear train mounted in part upon said rocker member, a differential drive mechanism also constituting a portion of said gear train, a pressure pad having an operating shaft, and means operatively connecting said shaft and said gear train to cause the pressure pad to be raised from engagement with the film before the film is fed by the film feeding means and to be returned to engagement with the film upon the cessation of film feeding movement.

15. A construction in accordance with claim 14, wherein there is provided a differential gear assembly including two co-acting gears, two pinions meshing respectively with said co-acting gears, a ratchet wheel mounted adjacent said rocker member, a dog to engage with said ratchet wheel to hold said ratchet wheel from rotation upon initiation of film feeding movement occasioned by rotating said film take-up spool, a gear upon said rocker member constituting a portion of said gear train, two gears co-axially mounted with respect to said ratchet wheel, one of said gears being held from turning movement by said ratchet, thereby causing the entire gear assembly, excepting said ratchet wheel and the other co-axially mounted gear to be turned, and said pressure pad being operatively connected to said gear assembly, the position of which pressure pad is changed with respect to the face of the film by said movement of said gear assembly.

16. A construction in accordance with claims 14, wherein there is provided a differential gear assembly including two co-acting gears, two pinions meshing respectively with said co-acting gears, a ratchet wheel mounted adjacent said rocker member, a dog to engage with said ratchet wheel to hold said ratchet wheel from rotation upon initiation of film feeding movement occasioned by rotating said film take-up spool, a gear upon said rocker member constituting a portion of said gear train, two gears co-axially mounted with respect to said ratchet wheel, one of said gears being held from turning movement by said ratchet wheel when the latter is engaged by said dog, thereby causing the entire gear assembly, excepting said ratchet wheel and the other co-axially mounted gear, to be turned, the operating connections from said differential gear to said pressure pad operating shaft including a connecting link and a crank connected to said link and to said shaft, whereby the pressure pad is removed from engagement with the face of the film, thereby providing mechanism whereby the pressure pad is positively lifted from contact with the film before the film starts to move.

17. A photographic camera in accordance with claim 9, but wherein the said differential mechanism includes means holding one part of said differential mechanism stationary and causing another part thereof engaging the said part held stationary to travel about said part held stationary, and by such traveling movement to remove the pressure-pad-like member from contact with the film very shortly before said take-up spool is rotated in the film feeding movement.

18. A photographic camera in accordance with claim 9, but wherein the said differential mechanism includes a gear, means acting predeterminedly to hold said gear temporarily from rotation, another gear in mesh with said gear predeterminedly held temporarily from rotation and which, when such gear is so held from rotation, is caused to travel along the periphery of the gear, so held stationary, a part whereon said second mentioned gear is mounted and which, by the traveling action of said second mentioned gear, is itself caused to move, and by such movement of the part whereon said second mentioned gear is mounted acts to remove the pressure-pad-like member from contact with the sensitized film very shortly before said film take-up spool is rotated in the film feeding movement.

19. A photographic camera in accordance with claim 9, but wherein the said differential mechanism includes a gear assembly having two co-acting gears, two pinions meshing respectively with said co-acting gears, a ratchet wheel, a dog to engage with said ratchet wheel to hold said ratchet wheel from rotation upon initiation of film feeding movement occasioned by rotating the film take-up spool, a gear co-axially mounted with respect to said ratchet wheel, and with one of said two co-acting gears, one of said co-axially mounted gears being held from turning movement by said ratchet wheel when the latter is engaged by said dog, thereby causing the entire gear assembly, excepting said ratchet wheel and one of said co-axially mounted gears, to be turned.

20. A photographic camera in accordance with claim 9, but wherein the differential movement of said differential mechanism begins very nearly simultaneously with the commencement of a lengthwise feeding movement of the sensitized film by said film feeding means, to withdraw the pressure-pad-like member from contact with the sensitized face of the film, and wherein interposed between and operatively connecting the pressure-pad-like member and said differential mechanism there is provided a link that is moved by said differential mechanism and a crank member connected to said link, said pressure-pad-like member having a pivotal shaft to which said crank member is connected.

21. A photographic camera in accordance with claim 9, but wherein the differential movement of said differential mechanism occurs very nearly simultaneously with the commencement of a lengthwise feeding movement of the sensitized film by said film feeding means, to withdraw the pressure-pad-like member from contact with the sensitized face of the film, and wherein operatively connected with the shutter operating mechanism of the camera, there is provided a link, a gear operatively related thereto, a pivoted arm that is moved upon the rewinding of the shutter and has two gears mounted thereon, and which pivoted arm, upon swinging movement thereof, causes two of said gears to mesh and also causes said other of said gears to mesh with a gear of the differential mechanism.

22. A photographic camera comprising film supporting means for the sensitized film including a film supply spool and a film take-up spool, and electrically operated means for intermittently feeding the sensitized film for the next exposure by rotating said film take-up spool, including an electric circuit, a motor therein, a train of gearing driven by said motor including a film rewind gear, a pivoted gear-carrying rocker member having an arm provided with an armature, a film clutch magnet in said circuit to rock said member by acting electrically upon said armature, said electric circuit having means to energize said magnet when sensitized film is to be fed one step by said electrically operated means, thereby to rock said rocker member to bring a gear carried by said rocker member into meshing relation with said film rewind gear, whereby said film is fed a single step following the exposure of a sensitized area thereof, there being provided a co-acting element of the film feeding means, a gear 114, a ratchet wheel co-axial with said gear, and a dog to engage with the teeth of said ratchet wheel, thereby to hold said ratchet wheel and said gear from rotation upon initiation of film feeding movement, and there being provided movement-controlling means in mesh with said gear and the movement whereof is affected by the holding from rotation of said co-axial gear and ratchet wheel.

23. A photographic camera comprising film supporting means for the sensitized film including a film supply spool and a film take-up spool, and electrically operated means for intermittently feeding the sensitized film for the next exposure by rotating said film take-up spool, including an electric circuit, a motor therein, a train of gearing driven by said motor including a film rewind gear, a pivoted gear-carrying rocker member having an arm provided with an armature, a film clutch magnet in said circuit to rock said member by acting electrically upon said armature, said electric circuit having means to energize said magnet when sensitized film is to be fed one step by said electrically operated means, thereby to rock said rocker member to bring a gear carried by said rocker member into meshing relation with said film rewind gear, whereby said film is fed a single step following the exposure of a sensitized area thereof, there being provided a gear 113 in mesh with one of the gears carried by said rocker member, a ratchet wheel co-axial and fast with said gear 113, and a latch member having a dog to engage with said ratchet wheel, thereby to hold said gear 113 and said ratchet wheel from rotation upon initiation of film feeding movement, and movement-controlling means in mesh with said gear 113 and the movement whereof is affected by the holding from rotation of said co-axial gear 113 and said ratchet wheel.

24. Means for operating the pressure pad of a photographic camera comprising, in combination, means to support a film, film feeding means, a pressure pad to engage flatwise the surface of the film whenever the film is not being fed, and means operatively connecting in action the film feeding means to the pressure pad, thereby to remove the pressure pad from contact with the film by the action of the said film feeding means, and only while the film is being fed, such connecting means including differential means, said differential means including a gear, a movable arm carrying other gears, means to move said arm to bring one of the gears carried by the said arm into mesh with said first mentioned gear, means to hold said first mentioned gear from rotation, another gear meshing with said first mentioned gear and which, when said first mentioned gear is held stationary, is itself caused to travel bodily along the periphery of the gear so held stationary, a movable member whereon is supported the gear that is caused to travel bodily, and pressure pad operating means connected to said movable member and to said pressure pad to move the latter, thereby separating it from the film when the latter is caused to move by the film feeding means.

25. A construction in accordance with claim 24, but wherein the means to move said movable arm, and thereby to bring a gear thereof into mesh with the first mentioned gear, is a solenoid.

26. Means for operating the pressure pad of a photographic camera comprising, in combination, means including a film supporting spool and a film take-up spool to support a film, film feeding means including means to impart rotative movement to said film and take-up spool, a pressure pad to engage flatwise the surface of the film whenever the film is not being fed, and means operatively connecting in action the film feeding means to the pressure pad, thereby to remove the pressure pad from contact with the film by the action of the said film feeding means in imparting rotative movement to said film take-up spool, and only while the film is being fed, such connecting means including differential means, said differential means including a gear 118, a ratchet co-axial with and movable with said gear 118, a latch member to engage and thereby hold from turning movement said ratchet, a movable arm having a gear 37, two gears 113 and 114 integral with each other and co-axial with the gear 118, said gears 37 and 113 being brought into mesh by a movement of the said arm, a movably mounted pressure pad operating arm having thereon two gears 124 and 125 meshing with each other and also meshing respectively with said gears 114 and 118, and which gears 124 and 125, when gear 118 is held stationary upon its own axis, are caused to travel bodily along the periphery of said gears 114 and 118, and operating connections between said pressure pad operating arm and the said pressure pad, to move said pad away from the surface of the film when the latter is fed by the film feeding means.

27. Means for operating the pressure pad of a photographic camera comprising, in combination, means including a film supporting spool and a film take-up spool to support a film, film feeding means including means to impart rotative movement to said film and take-up spool, a pressure pad to engage flatwise the surface of the film whenever the film is not being fed, and means operatively connecting in action the film feeding means to the pressure pad, thereby to remove the pressure pad from contact with the film by the action of the said film feeding means, and only while the film is being fed, such connecting means including differential means, said differential means including a gear 118, a ratchet co-axial with and movable with said gear 118, a latch member to engage and thereby hold from turning movement said ratchet, a movable arm having a gear 37, gears 113 and 114 integral with each other and co-axial with the gear 118, said gears 37 and 113 being brought into mesh by a movement of the said arm, a movably mounted pressure pad operating arm having thereon gears 124 and 125 meshing with each other and also meshing respectively with said gears 114 and 118, and which gears 124 and 125, when gear 118 is held stationary upon its own axis, are caused to travel bodily along the periphery of said gears 114 and 118, a link connected to the said pressure pad operating arm, and a crank member connected to the said link and also connected to the pressure pad, thereby to move the latter away from the face of the film when the latter is fed by the film feeding means.

28. In a photographic camera, film supporting means including a film supporting spool and a film take-up spool, film feeding means including means to rotate said film take-up spool, a pressure pad to engage the film when stationary and to be withdrawn from engagement therewith throughout and occasioned by the film feeding movement, said pressure pad having a shaft, means to turn said shaft to withdraw the pressure pad from the film throughout rotative-film take-up feeding movement of said film take-up spool and to restore it to contact with the film, said means to turn said shaft for said purpose including a crank connected to said shaft, a link connected to said crank, a differential arm connected to said link, two, parallel, spaced, differential plates fast with and carried by said arm, and differential drive mechanism mounted between said differential plates, said differential drive mechanism including two gears mounted to rotate freely, another gear, a ratchet wheel fast with said last mentioned gear, two pinions carried by said differential plates, meshing with each other and respectively meshing with said two first-mentioned gears, a dog mounted so as periodically to engage with teeth of the said ratchet wheel, thereby to hold it and the said gear that is fast therewith from turning and thereby causing one of said pinions to travel bodily along the periphery of the gear that is fast with the ratchet wheel, thereby causing the differential plates to turn, thereby moving the said arm and the said link so as thereby to turn the said crank member so as to turn the said shaft, and thereby lift the pressure pad from the film by rotative movement of the said film take-up spool acting through said differential drive mechanism.

29. Mechanism in accordance with claim 28, but wherein said two differential plates are provided with means to move the dog out of engagement with the said ratchet wheel at the end of the said turning movement of said differential plates, so as again to permit rotative movement of said ratchet wheel.

30. Mechanism in accordance with claim 28, but wherein there is provided a shaft carrying two of said gears, and wherein there is also mounted upon said shaft another gear adapted to be rotated from a source of movement.

31. Mechanism in accordance with claim 28, but wherein there is provided a shaft carrying two of said gears, and wherein there is also mounted upon said shaft another gear, and wherein there is provided a rocker arm having a gear adapted to mesh at times with one of said gears, and a train of gearing to rotate said gear that is on the rocker arm, and a film rewind gear having a pinion adapted periodically to move with a gear of said train of gears.

LOUIS D. NADEL.

REFERENCES CITED

The following references are of record in the file of this patent:

UNITED STATES PATENTS

| Number | Name | Date |
|---|---|---|
| 1,366,363 | Darby | Jan. 25, 1921 |
| 1,427,575 | Brenkert | Aug. 29, 1922 |
| 2,115,014 | Drager | Apr. 26, 1938 |
| 2,138,068 | Mulch | Nov. 29, 1938 |
| 2,180,028 | Wittel | Nov. 14, 1939 |
| 2,213,746 | Schubert | Sept. 3, 1940 |
| 2,231,765 | Landrock | Feb. 11, 1941 |
| 2,233,239 | Baumgartner | Feb. 25, 1941 |
| 2,362,813 | Gorey et al. | Nov. 14, 1944 |
| 2,393,534 | Hineline | Jan. 22, 1946 |

FOREIGN PATENTS

| Number | Country | Date |
|---|---|---|
| 148,744 | Great Britain | Dec. 2, 1920 |